May 31, 1927.

L. M. PERKINS

FIELD WINDING

Filed April 13, 1922

1,630,757

Patented May 31, 1927.

1,630,757

UNITED STATES PATENT OFFICE.

LAURENCE M. PERKINS, OF SYRACUSE, NEW YORK, ASSIGNOR OF ONE-HALF TO OWEN-DYNETO CORPORATION, OF SYRACUSE, NEW YORK, A CORPORATION OF NEW YORK.

FIELD WINDING.

Application filed April 13, 1922. Serial No. 552,311.

This invention relates to certain improvements in field windings for electric machines, particularly of the motor, generator or motor generator type, and the process for producing the same.

An object of the invention is the production of an electrical machine of the multipolar type in which a continuous conductor passes thru each of the inter polar spaces substantially axially in such a way as to give the poles alternately north and south polarity.

Another object of the invention is the production of a field winding for a multi-polar machine in a single operation.

Another object is the elimination of soldered joints in the field winding. A further object is the production of all the field windings for a multi-polar machine from a continuous conductor.

Other objects and advantages relate to the details of construction and form of the field winding, and the process used in producing the same, all as will more fully appear from the following description taken in connection with the accompanying drawings, in which.

The drawings illustrate a field winding for a six-pole machine, but my invention includes a winding for any multi-polar machine and by "multi-polar," I mean any machine having more than two poles.

The completed winding comprises a series of integrally connected field windings of U-shaped form, alternate U-shaped portions opening in opposite directions. The entire structure in lateral cross section is preferably substantially circular, and in lateral elevation constitutes a series of S-shaped portions. The side walls of the U-shaped recesses may preferably be substantially parallel, and extend substantially parallel with the axis of the winding when considered upon the inner circumference of the completed field winding, so that the U-shaped recesses are capable of receiving a pole piece having substantially parallel sides and as each of the U-shaped recesses is open at one end, the field winding does not encircle any pole piece.

The field winding of this invention is built up of a continuous conductor —1— which may be formed of a single strip of copper wire, ribbon or strap, or for flexibility purposes the continuous conductor may be formed of a double, triple, or other plural strap constituting in effect a single, continuous conductor which should be suitably insulated and wound as illustrated, to produce a laterally circular structure formed of a plurality of longitudinally U-shaped laterally curved pole piece receiving windings —2—, each separate pole piece winding consisting of a plurality of overlying or telescoped U-shaped thicknesses of said ribbon, wire, or strap.

Each side of any one of the U-shaped sections constitutes a side of the adjacent U-shaped section, said overlying parallel extending layers of said strap winding back and forth thru the inter-polar spaces and extending partially around three sides only of each pole piece.

Figure 3:
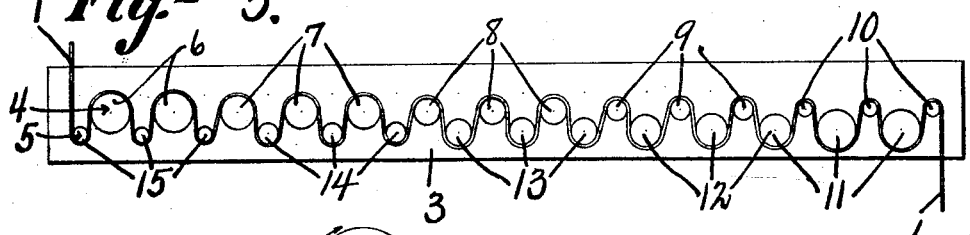
Figure 3 illustrates an apparatus used in manufacturing the winding of my invention.
Figure 4:
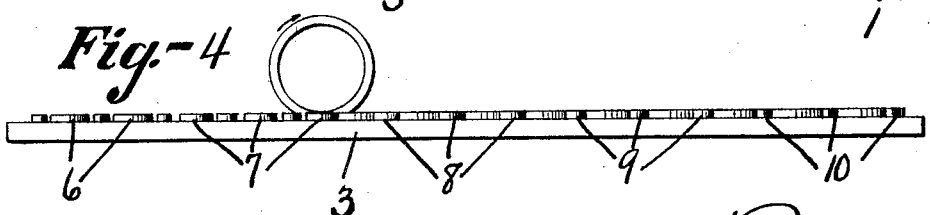
Figure 4 is a side elevation of the same apparatus, illustrating the method of rolling the inter-fitting layers of the conductor together to form the completed winding.

Various methods of manufacturing this field winding may be devised, one satisfactory one being illustrated in Figures 3 and 4 in which a support or base —3— carries a series of shaping pins, the relative arrangement, number and size of said pins dependent on the size of the field winding and the number of pole receiving U-shaped spaces to be formed.

The illustration discloses a board equipped with pins suitable for forming the six pole field winding disclosed.

Various sizes of pins are needed to form the exterior, interior and intermediate layers of the continuous conductor as formed in the completed winding. The pins are arranged in two rows —4— and —5— staggered with respect to each other, and each row comprises a plurality of series of pins, the pins of each series being the same size, and each series of pins differing in size from the pins of the other series of the same row. One row of pins is arranged in a series of decreasing size from end to end, and the other row in a series of increasing size from end to end from the same end toward the other end, so that the smallest pins of one row are arranged in staggered relation with respect to the largest pins in the other row. Each row preferably contains the same number of series and the same number of pins in each series, the size being such as to form the interfitting layers of the continuous conductor, as illustrated.

Figure 1:
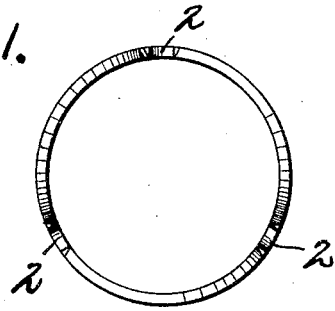
Figure 1 is an end elevation of a field winding of my invention.
Figure 2:
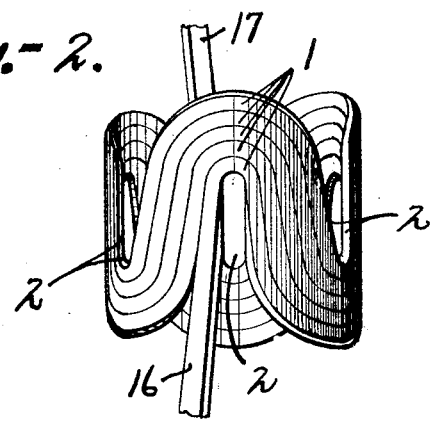
Figure 2 is a side elevation of the same.

Specifically the row —4— comprises two large pins —6—, three somewhat smaller pins —7—, three still smaller pins —8—, three still smaller pins —9— and three pins —10— smaller than the pins —9—. The row —5— comprises the same series of pins and the same size pins in each series beginning at the opposite end of the row with two large pins —11— corresponding to the pins —6—, three smaller pins —12— corresponding to the pins —7—, three still smaller pins —13— corresponding to the pins —8—, and three still smaller pins —14— corresponding to the pins —9—, and three still smaller pins —15— corresponding to the pins —10—. When the conductor —10— has been wound back and forth around these pins as illustrated, first around one of the small pins —15— and then around one of the pins —6—, and the continuous conductor has been formed into the oppositely opening loop shaped structure illustrated in Figure 3 starting at one end as the left hand end of the drawing, the loop formed around the first pin —15— is by rolling the strap into laterally circular form, rolled into the loop formed around the first pin —14— and by continuing the rolling process, the loop formed around the first pin —6— forms a layer outside of the layer or loop formed around the second pin —7—, and so forth, until the entire continuous conductor is rolled into the form shown in Figure 2, the ends of the conductor constituting the terminals or leads —16— and —17—. This method of producing the field winding consisting in forming the strap, ribbon or wire into loops of proper size and in proper relation, and then rolling the loops of one size into the loops of the next size or about the loops of the next size so as to form the layers of the completed winding, is efficient and comparatively simple, and inexpensive in the production of a novel and highly efficient field winding.

Although I have shown and described a specific construction as illustrative of a preferred embodiment of my invention, and as illustrative of a field winding adapted to a particular multi-polar machine, I do not desire to limit myself to the shape or size of the winding, or the details of its form or construction or to the particular number of poles for which the same may be designed, as various changes may be made in the form or construction and arrangement, without departing from the invention as set forth in the appended claims.

I claim:

1. A field winding for a multi-polar machine substantially circular in lateral cross section and consisting of a series of longitudinally arranged sinuous U-shaped pole-receiving layers of conductor each transversely curved and arranged substantially parallel to the operative axis of the machine, alternate U-shaped layers opening in opposite directions.

2. A field winding for a multi-polar machine, such winding formed of a continuous conductor wound to form a series of integrally connected transversely curved U-shaped pole-receiving windings, the longitudinal axis of each U-shaped pole receiving winding and the operative axis of the machine being in substantially the same plane, alternate U-shaped windings opening in opposite directions.

3. A field winding for a multi-polar machine consisting of a continuous transversely curved multiconductor sinuous winding having preformed pole receiving cavities therein.

In witness whereof I have hereunto set my hand this 3d day of April, 1922.

LAURENCE M. PERKINS.